United States Patent [19]

Stefanski et al.

[11] Patent Number: 5,180,505
[45] Date of Patent: Jan. 19, 1993

[54] DEWATERING METHOD

[76] Inventors: Marek J. Stefanski; Maria Stefanski, both of 72 Glencair Ave., Ottawa, Ontario K1S 1M6; Louis L. Sirois, 2 Rurual Route, Woodlawn, Ontario K0A 3M0, all of Canada

[21] Appl. No.: 712,547

[22] Filed: Jun. 10, 1991

[51] Int. Cl.$^5$ .................... B01D 37/00; F26B 3/00
[52] U.S. Cl. ............................. 210/771; 210/770; 34/15; 34/36; 34/37
[58] Field of Search ............... 210/698, 699, 702, 710, 210/729, 770, 771; 34/15, 36, 37; 209/5; 426/271, 478, 489, 510, 511

[56] References Cited

U.S. PATENT DOCUMENTS

| | | | |
|---|---|---|---|
| 1,512,321 | 10/1924 | Wait | 210/771 |
| 1,693,417 | 11/1928 | Wait | 210/771 |
| 3,319,789 | 5/1967 | Brown et al. | 210/771 |
| 3,338,411 | 8/1967 | Von Der Gathen et al. | 210/742 |
| 3,744,543 | 7/1973 | Emmett, Jr. et al. | 159/49 |
| 4,231,868 | 11/1980 | Wang et al. | 209/5 |
| 4,290,896 | 9/1981 | Gordon et al. | 210/770 |
| 4,310,422 | 1/1982 | Romey et al. | 210/769 |
| 4,539,120 | 9/1985 | Robinson | 210/738 |
| 4,873,772 | 10/1989 | Moher | 34/36 |
| 4,990,264 | 2/1991 | Fuller et al. | 210/729 |

OTHER PUBLICATIONS

United States Statutory Invention Registration No. H258, Published Apr. 7, 1987, Henninger et al.
Daykin, K. W. et al., "Steam-Assisted Vacuum Filtration", vol. 7, No. 3, Mar. 1978, pp. 59-64.
Emmett, Jr., R. C. et al., "Steam Drying of Filter Cake", Chemical Engineering Progress, vol. 68, No. 1, Jan. 1972, pp. 51-55.
Kelly, E. G. et al., "Filtration", Introduction to Mineral Processing, pp. 343-355.
Silverblatt, C. E. et al., "Moisture Content of a Fine--Coal Filter Cake", Industrial and Engineering Chemistry, vol. 46, No. 6, Jun. 1954, pp. 1201-1207.

Primary Examiner—Robert A. Dawson
Assistant Examiner—David Reifsnyder
Attorney, Agent, or Firm—Jones, Tullar & Cooper

[57] ABSTRACT

A method to improve dewatering of filter cakes in a filtration process. The method involves introducing a surfactant as a vapor or mist into a flow of steam and treating the filter cake with this gaseous mixture.

20 Claims, 2 Drawing Sheets

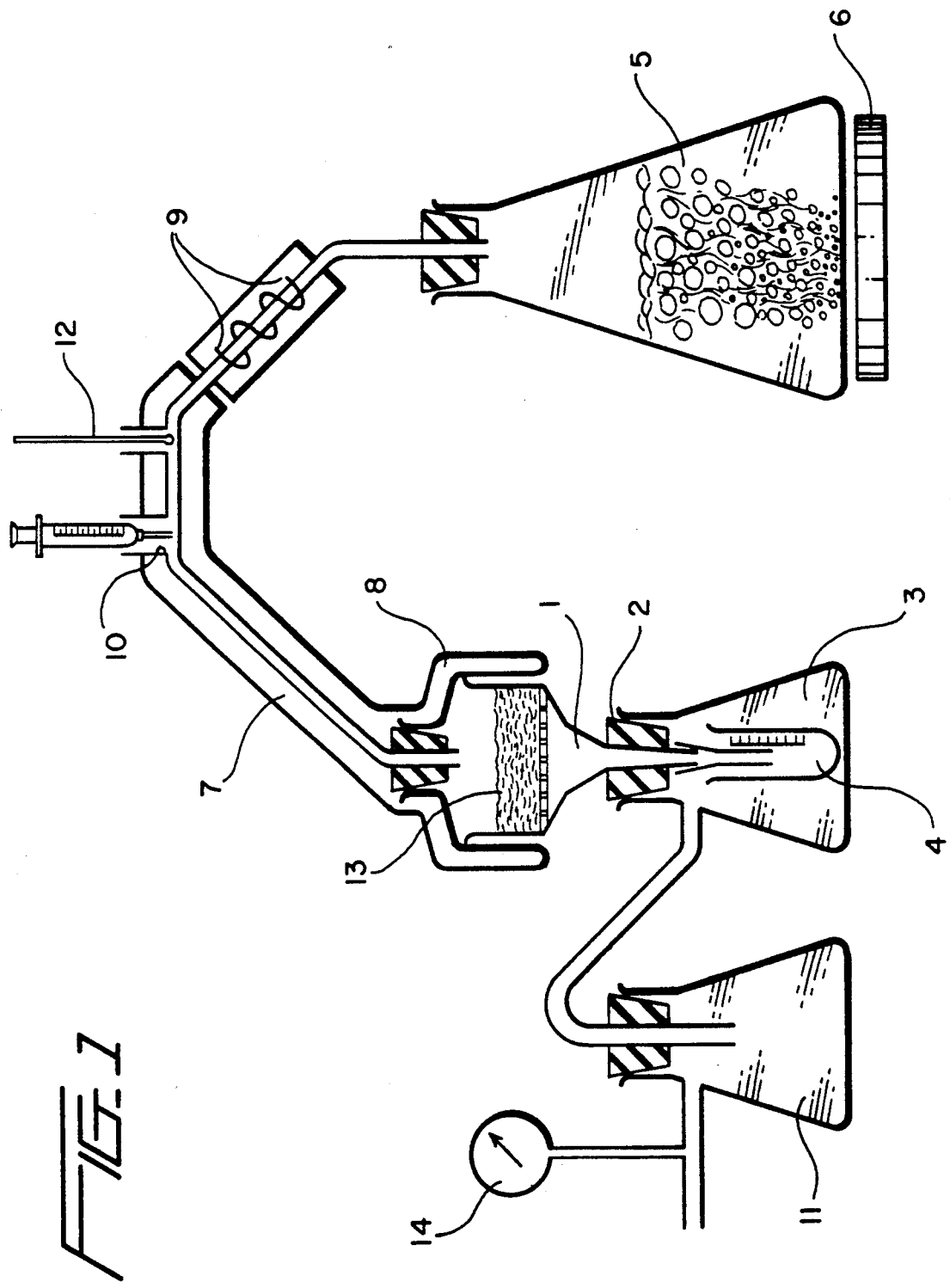

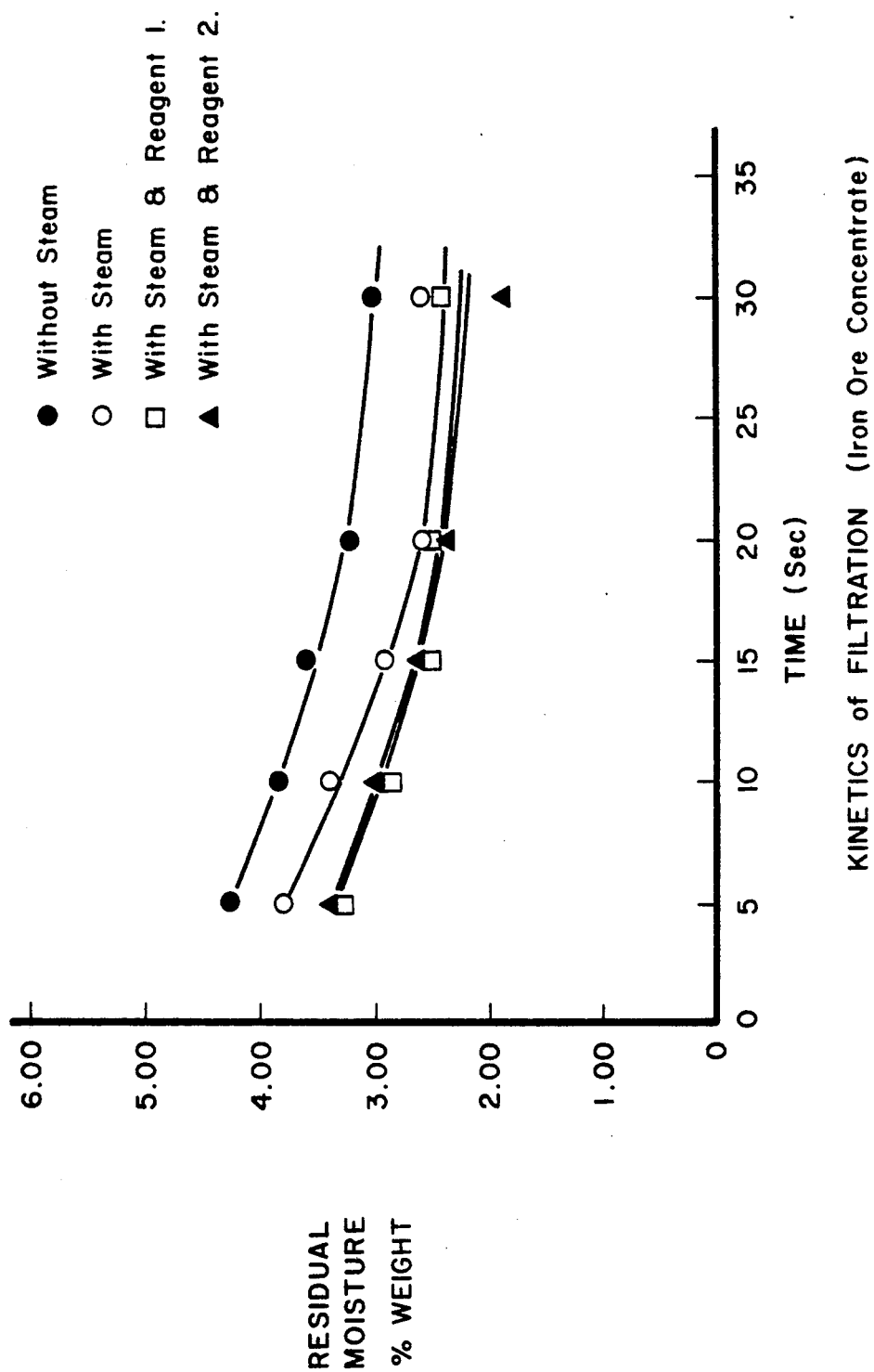

DEWATERING METHOD

BACKGROUND OF THE INVENTION

The present invention is directed to a method of filtration and in particular to an improved method of dewatering the filter cake.

Methods and equipment for dewatering have been developed for use in industries ranging from treatment of municipal waste water to filtration of coal extracts and mineral concentrates. The removal of water in a filtration process requires consideration of various factors which relate to such variables as the type of filtration process, the filter, the nature of the particles to be filtered and the target moisture content of the filtered particles. Reduction of the moisture content of a filtered solid may be desirable for many reasons, which include: improved recovery from the filter chamber, reduction in transportation and handling costs, reduction of the energy cost of subsequent thermal drying and increased shelf life.

Filter cake dewatering may be improved by decreasing the viscosity of the retained water by temperature elevation. Thus, the use of steam as a method of lowering the residual moisture of filter cakes is widely known, c.f. U.S. Pat. Nos. 4,310,422, 3,744,543, 3,338,411 and 1,693,417. It is also known to use surfactants and flocculants to reduce moisture in filter cakes. Surfactants, anionic, non-ionic and cationic, are added to the slurry to lower the surface tension and viscosity of the aqueous phase and/or to render the surface of the solid phase more hydrophobic thereby resulting in more effective dewatering. Flocculants improve the sedimentation rate and the filtration rate by trapping fine particles of the precipitate to be filtered. A filter cake prepared with the use of flocculants is more porous and therefore more suitable for air drying. Steams, surfactants and flocculants are complimentary and are often used in combination.

However, conditioning the slurry with fixed concentrations of surfactants or flocculants can escalate processing costs and contaminate the effluent which may then require costly clean-up processing of large amounts of effluent.

SUMMARY OF INVENTION

The subject invention is therefore directed to an improved method of dewatering filter cakes comprising supplying a flow of steam or gas to a filter cake and adding a surfactant to the carrier steam or gas as a vapour or finely dispersed mist droplets. By this method, small amounts of surfactants are used and therefore lesser amounts report to the effluent.

BRIEF DESCRIPTION OF DRAWINGS

The invention will now be described with reference to the following drawings, in which:

FIG. 1 is a schematic representation of a typical laboratory vacuum filtration apparatus mounted with an assembly to supply steam and a portal for introduction of the surfactant into the steam flow; and FIG. 2 is a graph showing the kinetics of water removal from an iron ore filter cake.

DETAILED DESCRIPTION OF INVENTION

A typical filtration assembly model is shown in FIG. 1, comprising a filter funnel 1 sealingly mounted by a rubber stopper 2 to an evacuation flask 3 provided with a calibrated filtrate collection tube 4.

Steam is supplied by boiling water in a flask 5 using a heat source 6. Insulated tubing 7 provides a conduit for the passage of the steam from the steam flask 5 to a steam hood 8 mounted to the mouth of the filtering funnel 1. A heating coil 9 is provided around part of the tubing to prevent excessive condensation. A portal 10 is provided in the insulated tubing between the steam supply and the filter funnel 1 for the introduction of the surfactant into the steam flow. The surfactant is administered with a syringe, atomizer or like apparatus to provide a gas or finely divided droplets of the surfactant into the steam flow. Typically, a moisture trap 11 is provided between the vacuum source and the evacuated flask 3. The temperature of the steam can be monitored by mounting a thermocouple 12 to the insulated tubing 7.

In practice, the filter cake resulting from vacuum or pressure filtration of a suspension of particulate matter in water, is placed under the steam hood, as shown schematically in FIG. 1. Steam, evolving in flask 5, passes through the insulated tubing 7 to the filter cake 13. The surfactant is introduced into the steam flow through portal 10 by an appropriate surfactant distributor. In the preferred embodiments of the method of this invention, the surfactant is an organic molecule having a boiling point lower than 100° C. Upon introduction of such a surfactant into the flow of steam, the surfactant vaporizes and is carried in this phase to the filter cake.

The suitability of a surfactant will depend on several factors which will vary with the filtered material. In general, the performance of the surfactant will improve with its ability to decrease surface tension and viscosity of the aqueous phase trapped in the solid phase. Enhancement of the hydrophobicity of the solid phase will also improve this process.

Where the temperature of the steam or carrier gas is elevated sufficiently to vaporize the surfactant, the preferred method of introduction of the surfactant into the carrier flow is by injection. Where the surfactant does not vaporize, the preferred method of introduction is by means of an atomizer. The carrier flow will pass the surfactant to the filter cake in the form of fine droplets.

Table 1 sets out results of iron ore concentrate dewatering by vacuum filtration and the further dewatering resulting from treatment with steam alone and treatment by the method of the invention, namely, steam and a surfactant. The average reduction of water content of hematite when treated with the method of the invention was 34%. The results are shown in graph form in FIG. 2.

The amount of surfactant and the rate and timing of its introduction into the carrier flow may be varied. In the preferred embodiment, the surfactant is added after the filter cake has been dewatered by exposure to steam. In the trials set out in Table 1, the surfactant was added in one pulse. In another embodiment, the surfactant may be added in a series of pulses or at a fixed rate for a fixed period of time.

Surfactants of the preferred embodiments of the method of the invention are characterized with the capability of decreasing surface tension and/or viscosity of the water trapped in the filter cake or increasing the hydrophobicity of the solid phase of the filter cake. Preferred surfactants will vaporize upon introduction into the carrier flow.

In systems where the filter cake was comprised of hematite, it was observed that methanol and isopropanol, each, when used alone, gave poor results as surfactants. It is believed that neither of these alcohols was capable of lowering the surface tension of the retained water sufficiently to result in significant dewatering. Solutions comprised of or containing higher aliphatic alcohols are believed to yield favourable results. If introduced in the form of a mist, it is further believed that anionic surfactants based on sulphosuccinate or non-ionic surfactant filter aids will give good results.

TABLE 1

% reduction of moisture content of iron or concentrate, having a particle size of 13.2% of −200 mesh, when dewatered by different methods. The surfactant used was n-propanol.

| TRIAL NO. | TIME OF FILTRATION | DEWATERING METHOD | |
|---|---|---|---|
| | | STEAM NO SURFACTANTS | STEAM AND SURFACTANT |
| 1 | 10 | 12.69 | 38.34 |
| 2 | 10 | 29.44 | 43.33 |
| 3 | 10 | 13.14 | 24.48 |
| 4 | 15 | 15.26 | 27.60 |
| 5 | 15 | — | 21.34 |
| 6 | 15 | 20.18 | 28.01 |
| 7 | 15 | 20.72 | 17.68 |
| 8 | 5 | 11.27 | 20.89 |
| 9[1] | 15 | 7.69 | 22.14 |
| 10[1] | 15 | 14.71 | 22.0 |
| 11[2] | 15 | 16.05 | 31.48 |

[1]The iron ore concentrate was reground to produce a particle size of 26.5% of −200 mesh.
[2]The surfactant used was a common household detergent.

The results demonstrate that the addition of a surfactant to steam substantially enhances removal of moisture from the filter cake. An average reduction of 15% of the moisture content was observed when surfactants were added to the steam as compared to steam alone. The combination of steam and surfactants reduced the moisture content of the filter cake by an average of approximately 26%.

The method of the subject invention is adaptable for use on an industrial scale and may also be used in conjunction with different filtration assemblies. The method reduces contamination of the effluent filtrate liquors with the surfactant. Where the surfactant does not vaporize below 100° C., its administration into the steam flow should be by means of a vaporizer or like apparatus. The surfactant would then be carried to the filter cake as minute droplets. On an industrial scale, the surfactants may be added by measuring pump or gravity feed in amounts appropriate to the scale of operation.

The method of the invention has been disclosed with reference to specific surfactants. These serve only as examples and are not intended to limit the scope of the invention. The method of the invention may be used with many commercially available surfactants and filter aids, as well as combinations thereof. As an example, although methanol alone was determined to give poor results, a mixture of same with the common household detergent gave favourable results. It is believed that the methanol functioned as a dispersing agent thereby improving the efficiency of transfer of the detergent to the filter cake.

Many variations and modifications to the invention may be obvious to those skilled in the art and therefore fall within the scope of the invention. The method of the invention has been disclosed in relation to various embodiments which are merely illustrative and are not intended to limit the scope of the invention, as defined in the following claims:

We claim:

1. In a method of dewatering a filter cake, an improvement comprising the steps of:
   (a) supplying a flow of steam to the filtered cake; and
   (b) adding a surfactant to the steam whereby said surfactant is vaporized or dispersed into a fine mist and carried to the filter cake.

2. The method of claim 1 wherein the surfactant is added to the flow of steam by means of a syringe.

3. The method of claim 2 wherein the surfactant is added to the flow of steam in 1 pulse.

4. The method of claim 2 wherein the surfactant is added to the flow of steam in a series of pulses.

5. The method of claim 1 wherein the surfactant is added to the flow of steam by means of a measuring pump.

6. The method of claim 5 wherein the surfactant is added to the flow of steam in 1 pulse.

7. The method of claim 5 wherein the surfactant is added to the flow of steam in a series of pulses.

8. The method of claim 1 wherein the surfactant is added to the flow of steam by means of an atomizer.

9. The method of claim 8 wherein the surfactant is added to the flow of steam in 1 pulse.

10. The method of claim 4 wherein the surfactant is added to the flow of steam in a series of pulses.

11. The method of claim 1 wherein the surfactant is added to the flow of steam by means of gravity feed.

12. The method of claim 3 wherein the surfactant is added to the flow of steam in 1 pulse.

13. The method of claim 3 wherein the surfactant is added to the flow of steam in a series of pulses.

14. The method of claim 1 wherein the surfactant is an anionic surfactant based on sulphosuccinate.

15. The method of claim 1 wherein the surfactant is a higher aliphatic alcohol.

16. The method of claim 1 wherein the surfactant is n-propanol.

17. The method of claim 1 wherein the surfactant is a detergent.

18. The method of claim 1 wherein the surfactant is non-ionic.

19. The method of claim 1 wherein the surfactant is added to the flow of steam in 1 pulse.

20. The method of claim 1 wherein the surfactant is added to the flow of steam in a series of pulses.

* * * * *